United States Patent [19]
Nishimura

[11] Patent Number: 6,052,541
[45] Date of Patent: Apr. 18, 2000

[54] VIEWFINDER OPTICAL SYSTEM AND PHOTOGRAPHING APPARATUS HAVING THE SAME

[75] Inventor: Takeshi Nishimura, Yokohama, Japan

[73] Assignee: Canon Kabushiki Kaisha, Tokyo, Japan

[21] Appl. No.: 09/118,996

[22] Filed: Jul. 20, 1998

[30] Foreign Application Priority Data

Jul. 25, 1997 [JP] Japan .................................. 9-215724

[51] Int. Cl.$^7$ ................................................. G03B 17/24
[52] U.S. Cl. ......................... 396/382; 396/384; 396/386
[58] Field of Search .................................. 396/384, 385, 396/386, 382

[56] References Cited

U.S. PATENT DOCUMENTS

| | | | |
|---|---|---|---|
| 5,095,326 | 3/1992 | Nozaki et al. | 396/384 |
| 5,721,979 | 2/1998 | Takato et al. | 396/384 |
| 5,757,556 | 5/1998 | Nishimura | 359/692 |
| 5,798,873 | 8/1998 | Hoshi et al. | 359/692 |

FOREIGN PATENT DOCUMENTS

| | | |
|---|---|---|
| 63-226616 | 9/1988 | Japan . |
| 1-154114 | 6/1989 | Japan . |
| 3-121408 | 5/1991 | Japan . |

Primary Examiner—David M. Gray
Attorney, Agent, or Firm—Fitzpatrick, Cella, Harper & Scinto

[57] ABSTRACT

A viewfinder optical system includes, in order from an object side to an observation side, an objective optical system for forming a real image, a first optical member, the first optical member having a reflective surface by which to change a direction in which a light beam from the objective optical system advances, a second optical member, the real image being converted into an erecting image through the first optical member and the second optical member, and an eyepiece optical system for observing the erecting image, wherein the real image is formed on or near an exit surface of the first optical member, and the exit surface of the first optical member is a curved surface convex toward the observation side.

13 Claims, 10 Drawing Sheets

-1.0000    1.0000
SPHERICAL
ABERRATION

-2.0000    2.0000
ASTIGMATISM

-5.0000    5.0000
DISTORTION

-1.0000    1.0000
SPHERICAL
ABERRATION

-2.0000    2.0000
ASTIGMATISM

-5.0000    5.0000
DISTORTION

VIEWFINDER OPTICAL SYSTEM AND PHOTOGRAPHING APPARATUS HAVING THE SAME

BACKGROUND OF THE INVENTION

1. Field of the Invention

The present invention relates to viewfinder optical systems and, more particularly, to a viewfinder optical system of the external type independent of a photographic optical system, in which an inverted real viewfinder image (object image) formed by an objective lens system (objective optical system) on a primary image plane is converted into a non-inverted erecting viewfinder image by using a field lens and an image inverting means so as to be observed through an eyepiece lens, i.e., the viewfinder optical system of the real image type suited to still cameras, video cameras, etc.

2. Description of Related Art

Heretofore, as a type of viewfinder optical system for photographic cameras, video cameras, etc., there are a variety of proposals for a viewfinder optical system of the real image type in which a real viewfinder image formed on a primary image plane is observed through an eyepiece lens after passing through a field lens and an image inverting means. Such a real-image type viewfinder optical system is recently used in a great number of cameras, because it is easy to minimize the size of the entirety of the viewfinder optical system.

A viewfinder optical system of the real-image type, as disclosed, for example, in Japanese Laid-Open Patent Applications No. Hei 1-154114 and No. Hei 3-121408 is constructed in simple form, as comprising an objective lens system composed of only one lens of positive refractive power, a field lens of positive refractive power, an image inverting means and an eyepiece lens.

Further, in another Japanese Laid-Open Patent Application No. Sho 63-226616, there is proposed a viewfinder optical system having a simple construction, which comprises an objective lens system composed of two, positive and negative, lenses, an image inverting means composed of two, first and second, prisms, and an eyepiece lens, in which the objective lens system is made to form an object image in between the first prism and the second prism, and an entrance surface of the first prism is made to have a refractive power, thus the first prism functioning also as a field lens.

In the conventional real-image type viewfinder optical system, if the number of lens elements in the objective lens system is reduced to one, the lens configuration can be simplified, but the optical performance becomes difficult to keep good.

In particular, when it is designed to widen the field angle of the viewfinder optical system, problems arise in that it becomes difficult to correct distortion and that the magnification of the viewfinder optical system becomes low.

Further, in the viewfinder optical system having such a construction that the image inverting means is composed of two, first and second, prisms to effect an image inverting function and an entrance surface of the first prism is made to have a refractive power to function as a field lens, there are problems that, because the field lens is far away from an image plane of the objective lens system, the action as a strong field lens is difficult to obtain and that the first prism comes to increase in size.

BRIEF SUMMARY OF THE INVENTION

It is an object of the invention to provide a viewfinder optical system of the real-image type having a novel configuration, which assures improvements of the compact form of the entire optical system, while still making it possible to observe a good viewfinder image.

To attain the above object, in accordance with an aspect of the invention, there is provided a viewfinder optical system, which comprises, in order from an object side to an observation side, an objective optical system for forming a real image, a first optical member, the first optical member having a reflective surface by which to change a direction in which a light beam from the objective optical system advances, a second optical member, the real image being converted into an erecting image through the first optical member and the second optical member, and an eyepiece optical system for observing the erecting image, wherein the real image is formed on or near an exit surface of the first optical member, and the exit surface of the first optical member is a curved surface convex toward the observation side.

The above and further objects and aspects of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
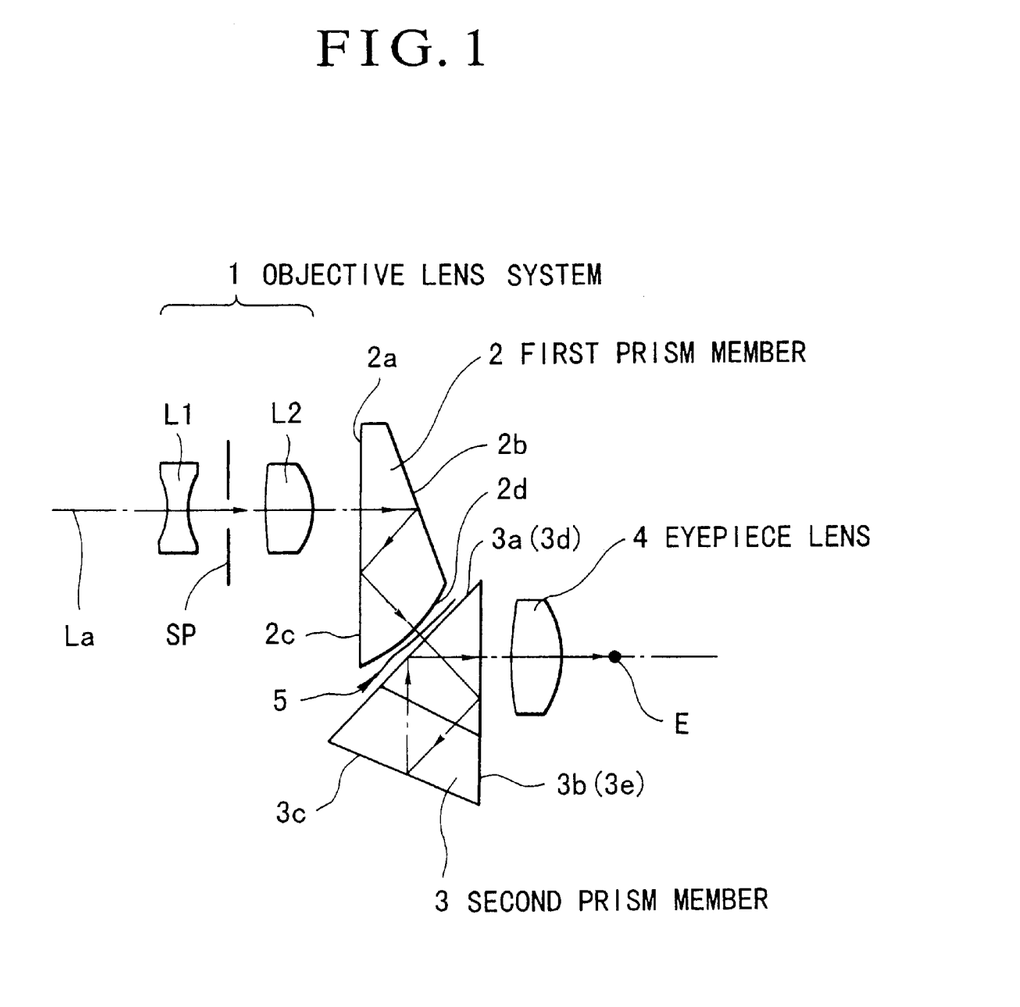
FIG. 1 is a schematic diagram of the main parts of a viewfinder optical system according to an embodiment of the invention.
Figure 2:
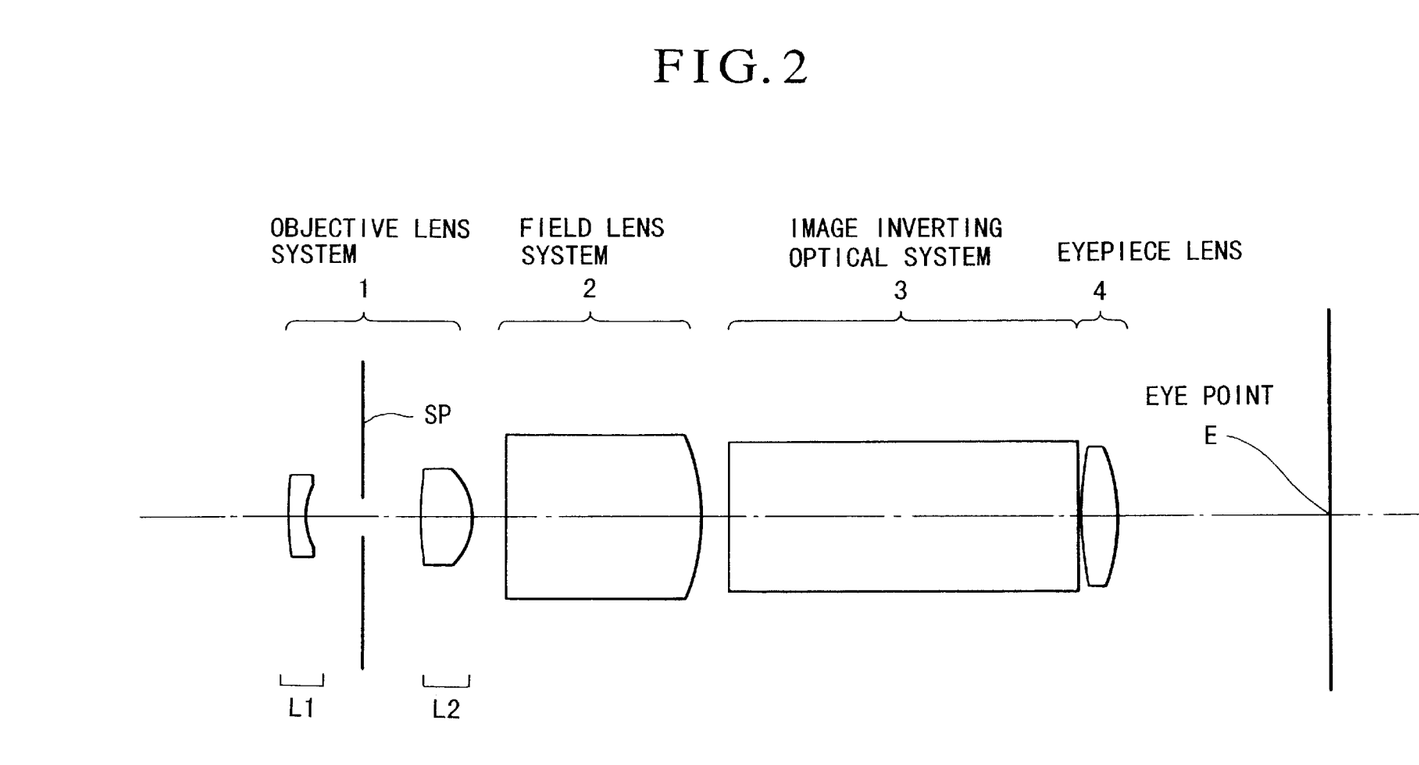
FIG. 2 is a lens block diagram of a numerical example 1.
Figure 3:
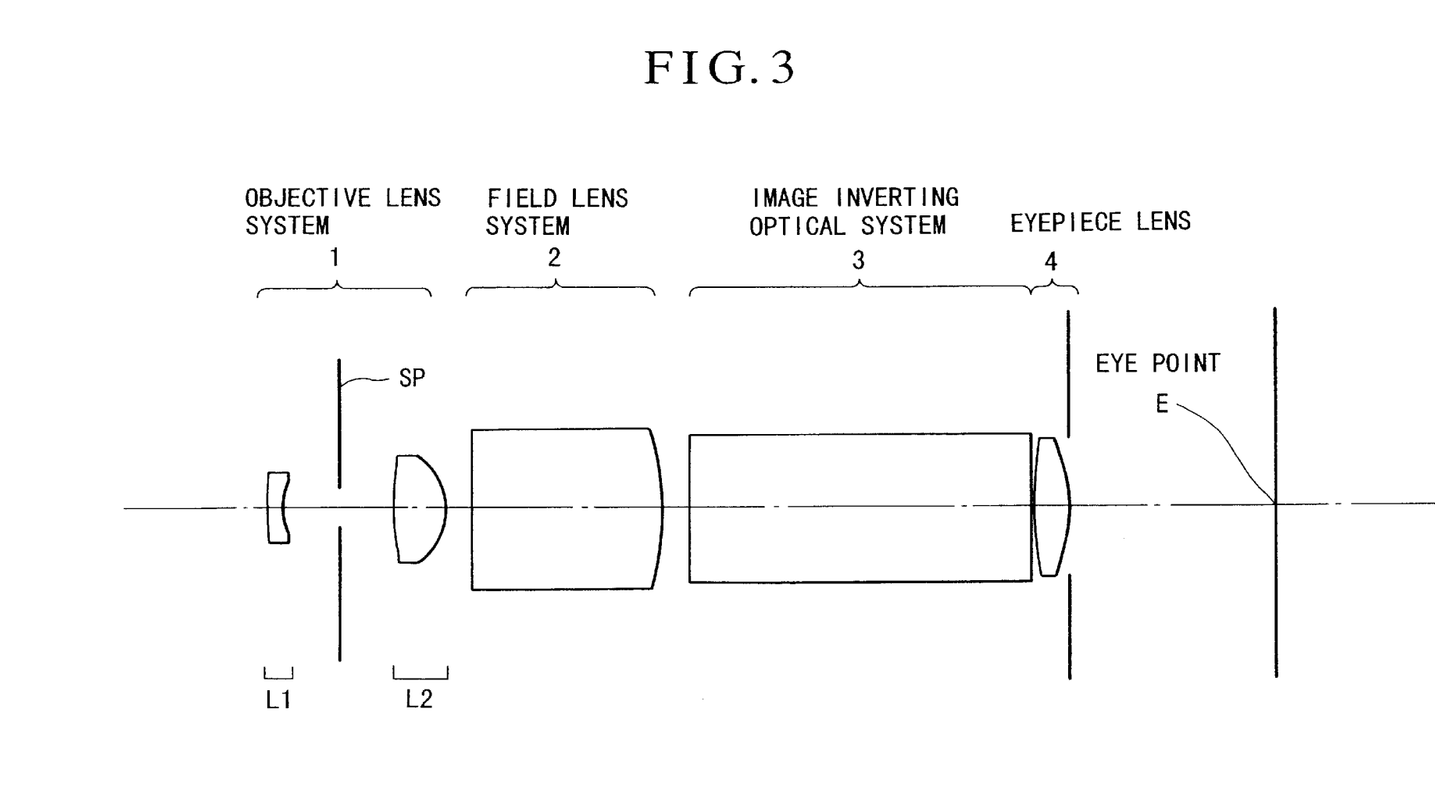
FIG. 3 is a lens block diagram of a numerical example 2.
Figure 4:
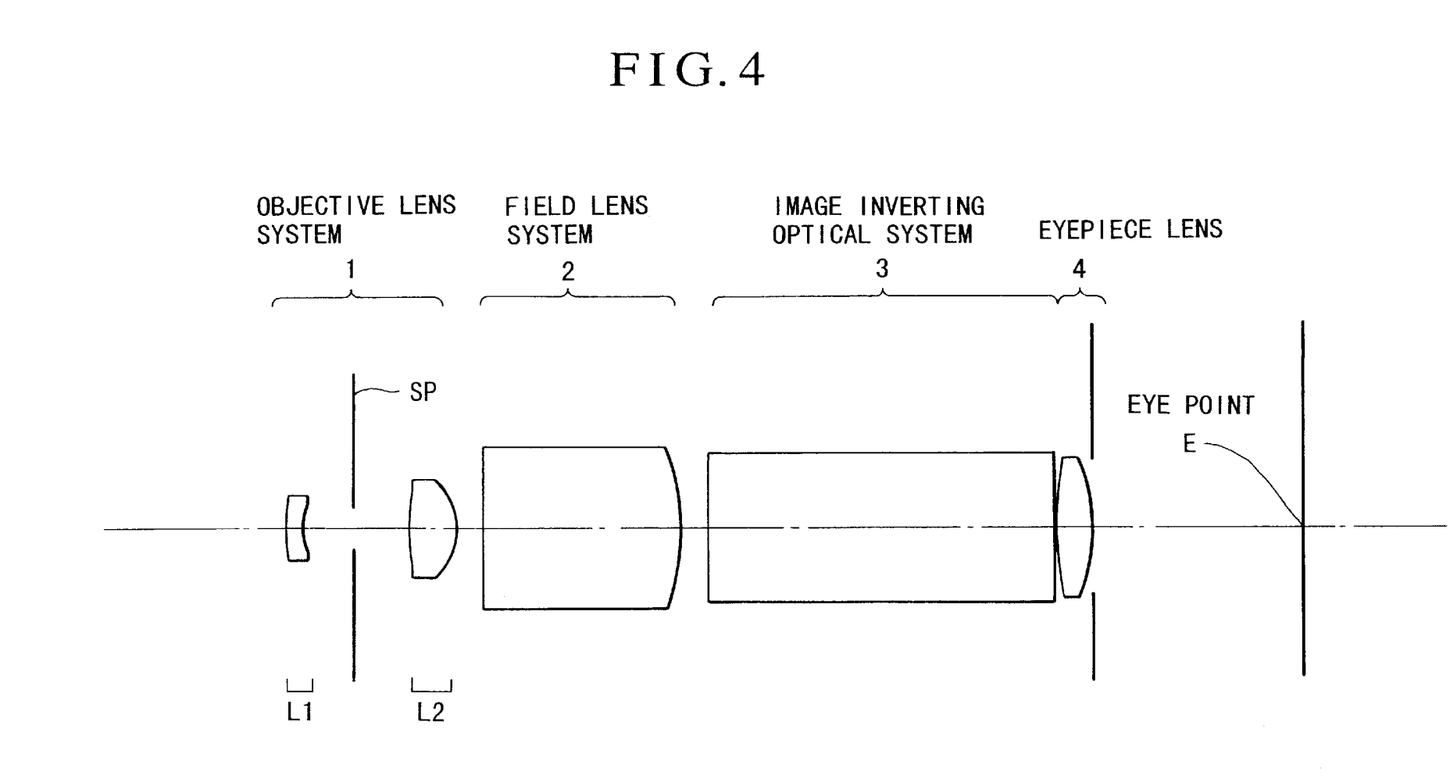
FIG. 4 is a lens block diagram of a numerical example 3.
Figure 5:
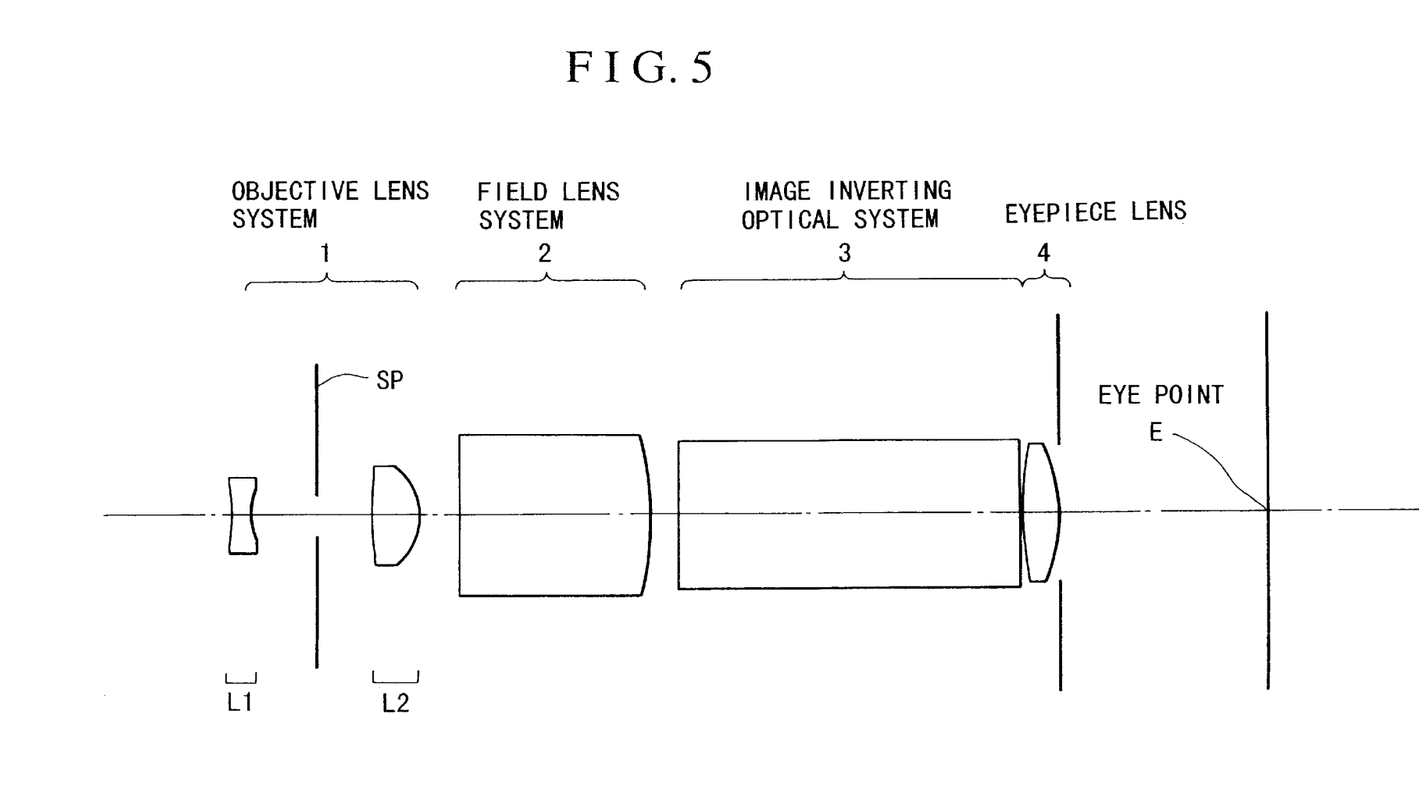
FIG. 5 is a lens block diagram of a numerical example 4.
Figure 6:
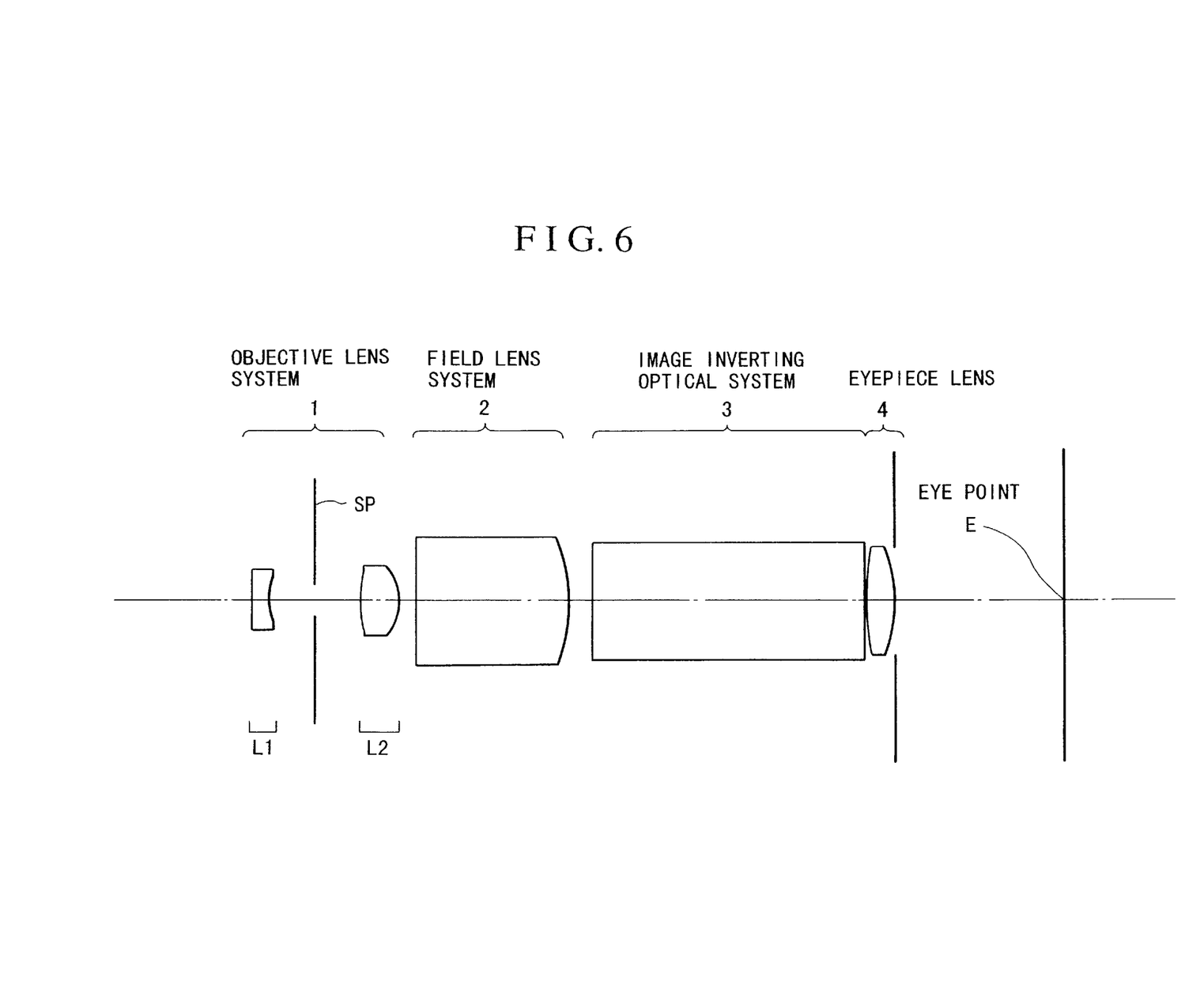
FIG. 6 is a lens block diagram of a numerical example 5.
Figure 7A:
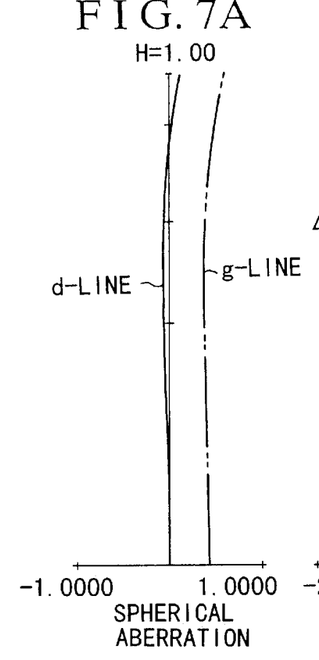
FIGS. 7A, 7B and 7C are graphic representations of the aberrations of the optical system of the numerical example 1.
Figure 7B:
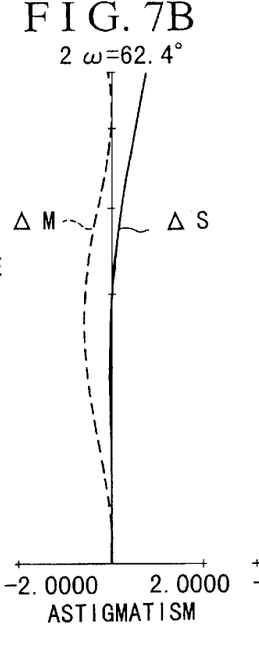
Figure 7C:
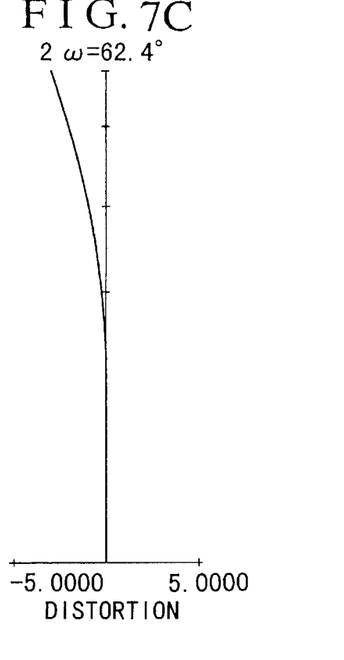
Figures 8A, 8B:
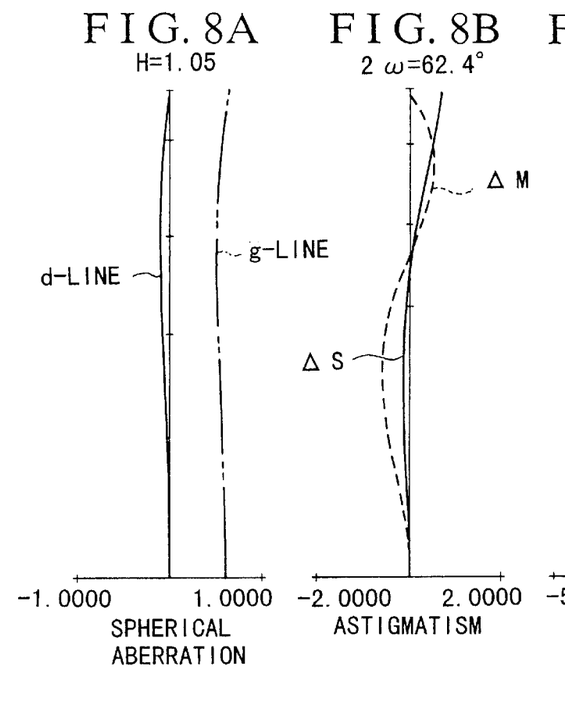
FIGS. 8A, 8B and 8C are graphic representations of the aberrations of the optical system of the numerical example 2.
Figure 8C:
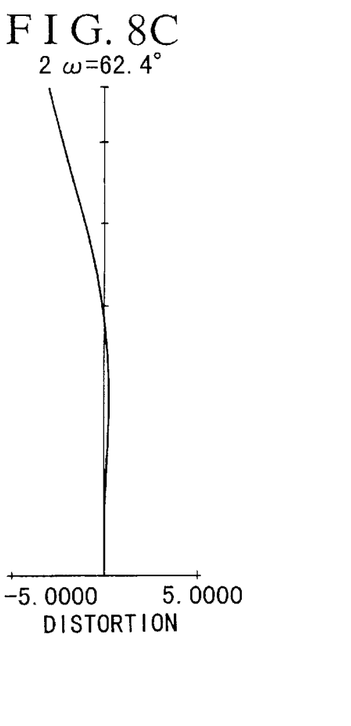
Figures 9A, 9B:
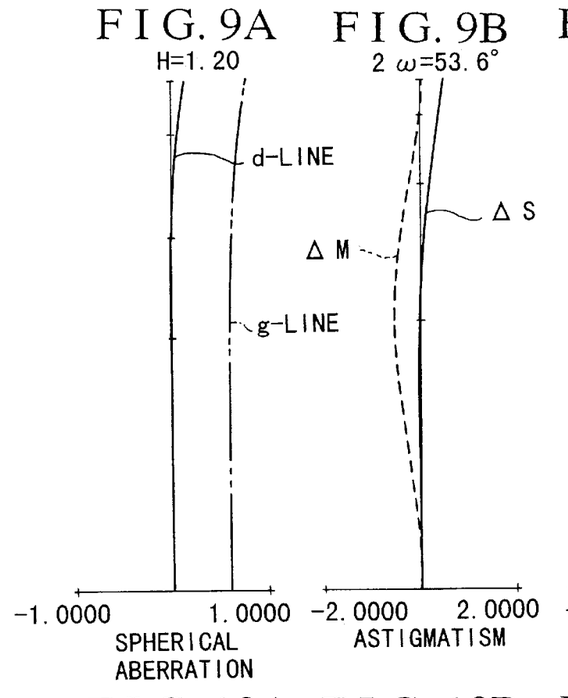
FIGS. 9A, 9B and 9C are graphic representations of the aberrations of the optical system of the numerical example 3.
Figure 9C:
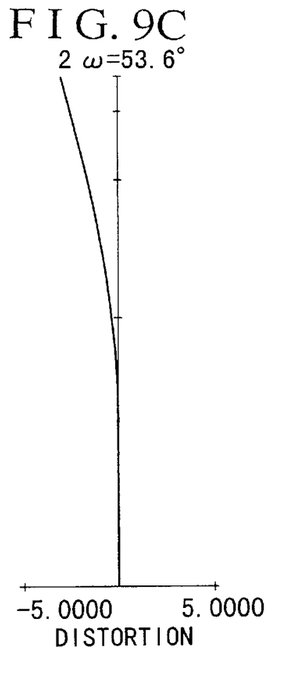
Figures 10A, 10B:
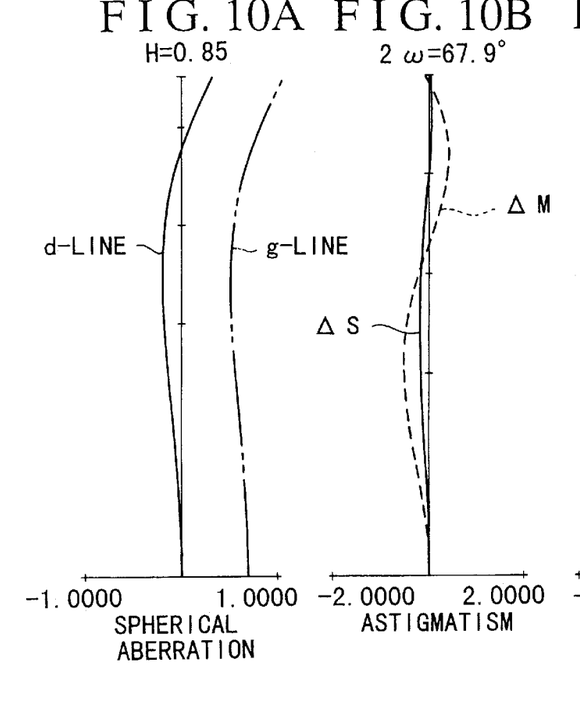
FIGS. 10A, 10B and 10C are graphic representations of the aberrations of the optical system of the numerical example 4.
Figure 10C:
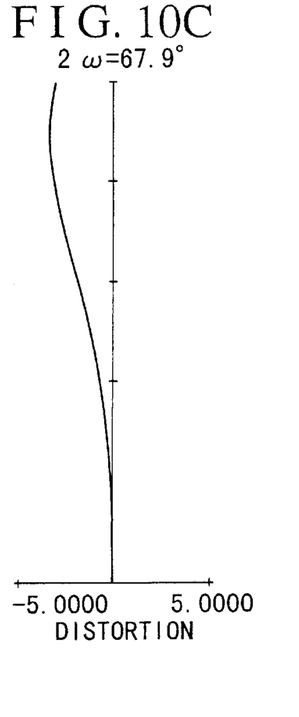
Figures 11A, 11B:
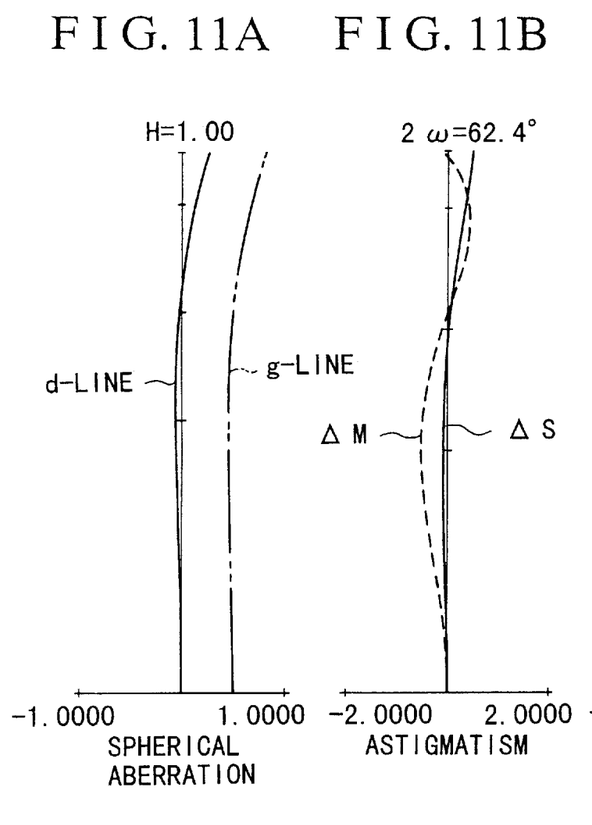
FIGS. 11A, 11B and 11C are graphic representations of the aberrations of the optical system of the numerical example 5.
Figure 11C:
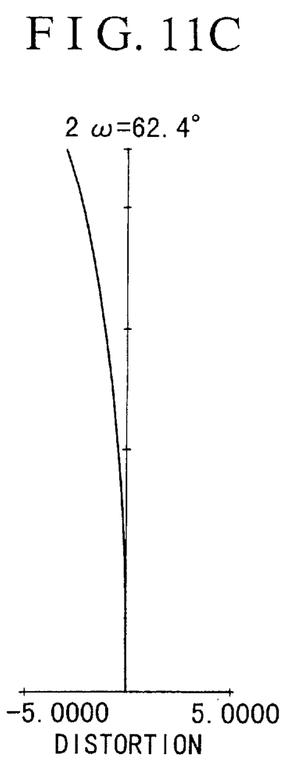

FIG. 1 in longitudinal section view shows the main parts of a viewfinder optical system according to the embodiment. FIGS. 2 to 6 show the main parts of numerical examples 1 to 5, respectively, of the viewfinder optical system shown FIG. 1, with the optical path developed. FIGS. 7A to 7C through FIGS. 11A to 11C are aberration curves of the numerical examples 1 to 5 of viewfinder optical system, respectively.

Referring to FIGS. 1 to 6, an objective lens system (objective optical system) 1 of positive refractive power is composed of a negative lens L1 and a positive lens L2, totaling two lenses. The objective lens system 1 has at least three aspheric surfaces. An aperture stop SP is disposed in the space between the negative lens L1 and the positive lens L2. A first prism member 2 serves as the field lens and is made in the form of a glass block (prism body) which is positive in refractive power and has at least two reflective surfaces to fold the optical path of a light beam from the objective lens system 1.

A second prism member 3 functions as an image inverting means and may be constructed in the form of, for example, either a roof prism or a Porro prism. In the case of FIG. 1, the roof prism is in use. An eyepiece lens (eyepiece optical system) 4 has a positive refractive power. Incidentally, the image inverting means may be constructed from a plurality of mirrors instead of a prism.

A In the present embodiment, the objective lens system 1 forms an inverted image (real image) of an object on a primary image plane 5 near an exit surface 2d of the first prism member 2. Then, the inverted object image is converted into a non-inverted erecting image by means of the second prism member 3. The non-inverted erecting image is observed from an eye point E through the eyepiece lens 4.

The first prism member 2 is so constructed and arranged that the light beam from the objective lens system 1 enters at an entrance surface 2a thereof which is a flat plane perpendicular to an optical axis La.

Then, the entering light beam from the entrance surface 2a advances to a surface 2b which is concave toward the entrance side and has a positive refractive power, and is then reflected therefrom toward a surface 2c which lies in the same plane as the entrance surface 2a. The surface 2b is inclined with respect to the optical axis La and has a reflection coating applied thereon by the vacuum evaporation technique. It should be noted here that not only the sphere, but also an asphere or toroid is applicable to the surface 2b.

The surface 2c totally reflects the light beam from the surface 2b so as to be made perpendicularly incident on a surface (exit surface) 2d having curvature, so that the light beam is made to exit from the surface 2d. The exit surface 2d is made to be a spherical, aspheric or toric lens surface convex toward the observation side.

The first prism member 2 functions to translate the light beam from the objective lens system 1 to the second prism member 3. In addition, the two reflective surfaces 2b and 2c of the first prism member 2 fold the light path to a compact size, thus assuring reduction of the size of the viewfinder optical system. The provision of the positive refractive power on the exit surface 2d makes the light beam to be convergent or parallel, thus assuring minimization of the size of the second prism member 3.

The second prism member 3 is provided with a surface (entrance surface) 3a, at which the light beam from the exit surface 2d of the first prism member 2 enters.

The entering light beam from the surface 3a is totally reflected from a surface 3b, which is nearly perpendicular to the optical axis La of the objective lens system 1, toward a surface 3c which is comprised of roof surfaces. The surface 3c reflects the light beam from the surface 3b toward a surface 3d, which is the same plane as that of the surface 3a.

The angle of inclination of the surface 3c is so adjusted that the light beam impinging on the surface 3d is totally reflected from the surface 3d to a direction parallel to the optical axis La.

The surface 3c, which is composed of roof surfaces, is arranged to fold the light beam in the direction of the shorter side of the observation field (viewfinder field), i.e., in the vertical direction of the ordinary camera. The totally reflected light beam from the surface 3d is made to be perpendicularly incident on a surface 3e, which is the same plane as the surface 3b, so that the light beam exits from the surface 3e to the outside.

Thus, an object image is formed by the objective lens system 1 on the primary image plane 5 near the exit surface 2d of the first prism member 2, and the object image is observed through the eyepiece lens 4 at the eye point D, along with viewfinder information such as index marks and a field frame provided on the exit surface 2d.

Next, the features of the viewfinder optical system according to the embodiment are described below.

(A1) The viewfinder optical system according to the embodiment satisfies a condition for the objective lens system as follows:

$$-5 < \frac{R1 + R2}{R2 - R1} < 5 \quad (1)$$

where R1 and R2 are the radii of curvature of surfaces on the object side and the observation side of the negative lens of the objective lens system, respectively.

The inequalities of condition (1) have an aim to determine a proper shape of the negative lens of the objective lens system. When the lower limit of the condition (1) is exceeded, as this means that the negative refractive power becomes weak, the back focal distance of the objective lens system tends to shorten objectionably. When the upper limit is exceeded, it becomes difficult to find out an appropriate lens design to correct distortion well.

To obtain a better optical performance, it is preferred to alter the lower limit of the condition (1) to "−3" and the upper limit to "1".

(A2) The viewfinder optical system according to the embodiment satisfies another condition for the objective lens system as follows:

$$-0.9 < \frac{R3 + R4}{R4 - R3} < 0.2 \quad (2)$$

where R3 and R4 are the radii of curvature of surfaces on the object side and the observation side of the positive lens of the objective lens system, respectively.

The inequalities of condition (2) have an aim to determine an appropriate shape of the positive lens of the objective lens system. When the lower limit is exceeded, the positive refractive power tends to become strong. Particularly, the lens surface on the pupil side (observation side) becomes strong in curvature, causing production of worse coma which is difficult to correct. When the upper limit is exceeded, astigmatism worsens. The difficulty of correcting this aberration increases objectionably.

To obtain a better optical performance, it is preferred to alter the lower limit of the condition (2) to "−0.7" and the upper limit to "−0.3".

(A3) The viewfinder optical system according to the embodiment satisfies a further condition for the objective lens system as follows:

$$-2 < D2/f1 < -0.3 \quad (3)$$

where D2 is the axial air separation between the negative lens and the positive lens of the objective lens system, and f1 is the focal length of the negative lens.

The inequalities of condition (3) give a range for the ratio of the air separation between the negative and positive lenses of the objective lens system to the focal length of the negative lens and have an aim chiefly to obtain high optical performance, while keeping the size of the entire optical system at a minimum.

When the lower limit of the condition (3) is exceeded, the distance from the optical axis to a point at which the off-axial light beam traverses the negative lens becomes short. Although this can reduce the diameter of the negative lens, it becomes difficult to correct all off-axial aberrations. When the upper limit is exceeded, the size of the entire optical system tends to increase largely and the distortion becomes difficult to correct. This violation, too, is objectionable.

It is more preferred to alter the lower limit of the condition (3) to "−1.5" and the upper limit to "−0.5".

(A4) The viewfinder optical system according to the embodiment satisfies a furthermore condition for the objective lens system as follows:

$$-2 < f2/f1 < -0.3 \quad (4)$$

where f1 and f2 are the focal lengths of the negative lens and the positive lens of the objective lens system, respectively.

The inequalities of condition (4) give a range for the ratio of the focal lengths of the negative and positive lenses of the objective lens system and have an aim to determine an appropriate distribution of the refractive power.

When the lower limit of the condition (4) is exceeded, as this means that the refractive power of the positive lens is too strong, astigmatism in particular becomes difficult to correct. When the upper limit is exceeded, as this means that the refractive power of the positive lens is too weak, the size of the objective lens system increases largely and the distortion becomes difficult to correct. This violation, too, is objectionable.

It is more preferred to alter the lower limit of the condition (4) to "−1.2" and the upper limit to "−0.5".

(A5) The viewfinder optical system according to the embodiment has an aperture stop arranged in between the negative lens and the positive lens of the objective lens system.

The aperture stop is effective to reduce the ghost arising mainly from the interreflections between the mechanical mountings of the negative and positive lenses. Further, unwanted light is avoided from entering the image inverting means and becoming a ghost image. The aperture stop has yet another effect of preventing the optical performance from deteriorating as the light beam that advances to the central zone enters more than necessary.

(A6) In the viewfinder optical system according to the embodiment, the objective lens system has at least three aspheric surfaces.

The reason for the above condition is to obtain a high optical performance in respect to the objective lens system. Particularly, when the aspheric surfaces are used on the object side of the negative lens and on the pupil side (observation side) of the positive lens, aberrations can be corrected advantageously.

For the lens surface on the object side of the negative lens, the aspheric shape is such that the negative refractive power becomes progressively weaker toward the margin. This gives an advantage of correcting well astigmatism in particular.

(A7) The viewfinder optical system according to the embodiment satisfies two conditions for the first prism member as follows:

$$-0.04 < DI/fe < 0.04 \quad (5)$$

$$-2 < fe/R7 < -0.3 \quad (6)$$

where DI is the distance from the exit surface of the first prism member to an object image formed by the objective lens system, R7 is the radius of curvature of the exit surface of the first prism member, and fe is the focal length of the eyepiece lens.

In the present embodiment, the exit surface of the first prism member is positioned in exact or near coincident with the image plane of the objective lens system, and formed to an appropriate curvature. These features allow the first prism member to play a role that, without causing deterioration of the imaging performance of the objective lens system, the rays of the axial light beam are made convergent or parallel after having exited from the objective lens system and before entering the image inverting means (second prism member) for erecting the image, thus assuring minimization of the size of the image inverting means.

The inequalities of condition (5) give a range for the ratio of the distance between the exit surface of the first prism member and the image plane of the objective lens system to the focal length fe of the eyepiece lens system and have an aim chiefly to produce an effect as the field lens.

When the lower limit of the condition (5) is exceeded, as this means that the exit surface too far overpasses the image plane of the objective lens system, the effect as the field lens is lost and the size of the objective lens system increases largely. When the exit surface is spaced too far away from the image plane of the objective lens system as exceeding the upper limit, the size of the image inverting means for image erection increases objectionably.

The inequalities of condition (6) give a range for the ratio of the radius of curvature R7 of the exit surface of the first prism member to the focal length fe of the eyepiece lens system and have an aim chiefly to produce an effect as the field lens.

When the lower limit of the condition (6) is exceeded, as this means that the refracting power of the exit surface is too strong, distortion deteriorates objectionably. When the upper limit is exceeded, the effect as the field lens decreases to increase the size of the objective lens system objectionably.

It is more preferred to alter the lower limit of the condition (6) to "−1.4" and the upper limit to "−0.6".

(A8) The viewfinder optical system according to the embodiment satisfies yet another condition for the first prism member as follows:

$$1.5 < N3 \quad (7)$$

where N3 is the refractive index N3 of the material of the first prism member.

When the lower limit of the condition (7) is exceeded, the optical total length of the objective lens system increases objectionably.

It is more preferred to alter the lower limit of the condition (7) to "1.55".

(A9) In the viewfinder optical system according to the embodiment, the first prism member is made from a glass block having at least two reflective surfaces.

If the first prism member is formed to a triangle prism with modification of its exit surface to a curvature, the number of design parameters increases. For example, the optical path of the objective lens system can be folded, thus assuring reduction of the size of the camera or the like. In addition, the triangle prism is unified with the field lens to further simply the structure of construction.

(A10) In the viewfinder optical system according to the embodiment, the first prism member is made positioned with its exit surface in near coincidence with the image plane of the objective lens system. This allows a means for the viewfinder information to be put on the exit surface of the first prism member.

With such an arrangement, the pieces of information, for example, a range finder mark, can be viewed in superimposed relation on the object image. Moreover, despite the arrangement being relatively simple, the viewfinder information can be displayed well.

Although the viewfinder optical system according to the embodiment satisfies all of the above-described features or conditions (A1) to (10), it is to be understood that these conditions may be selectively satisfied. Even in this case, improved results are attained independently of one another. So, all the features have not always to be satisfied at once.

Next, five numerical examples 1 to 5 according to the embodiment are shown. In the numerical data for the examples 1 to 5, ri is the radius of curvature of the i-th lens surface, when counted from the object side, di is the i-th axial lens thickness or air separation, and ni and vi are respectively the refractive index and Abbe number of the material of the i-th lens element. The shape of an aspheric surface is expressed in the coordinates with an X axis in the axial direction (direction in which light advances) and a Y axis in the direction perpendicular to an optical axis by the following equation:

$$X = \frac{(1/R)Y^2}{1 + \sqrt{1 - (Y/R)^2}} + AY^2 + BY^4 + CY^6 + DY^8$$

where R is the radius of the osculating sphere, and A, B, C and D are the aspheric coefficients.

Incidentally, the notation "D-0X" means $10^{-x}$.

The values of the factors in the above-described conditions (1) to (7) for the numerical examples 1 to 5 are listed in Table -1.

Numerical Example 1:

| f = 331.5 | | | |
|---|---|---|---|
| r 1 = 40.72 | d 1 = 1.20 | n 1 = 1.58306 | v 1 = 30.23 |
| r 2 = 5.48 | d 2 = 4.07 | | |
| r 3 = Stop | d 3 = 4.00 | | |
| r 4 = 15.78 | d 4 = 3.60 | n 2 = 1.49171 | v 2 = 57.40 |
| r 5 = −4.51 | d 5 = 2.40 | | |
| r 6 = ∞ | d 6 = 14.00 | n 3 = 1.57090 | v 3 = 33.50 |
| r 7 = −16.00 | d 7 = 2.00 | | |
| r 8 = ∞ | d 8 = 25.00 | n 4 = 1.57090 | v 4 = 33.80 |
| r 9 = ∞ | d 9 = 0.20 | | |
| r10 = 27.63 | d10 = 2.50 | n 5 = 1.49171 | v 5 = 57.40 |
| r11 = −14.37 | | | |

Aspheric Coefficients:

| | R | A | B | C | D |
|---|---|---|---|---|---|
| r 1: | 4.072D + 01 | 0 | 1.192D − 03 | −4.152D − 05 | 0 |
| r 4: | 1.578D + 01 | 0 | −9.795D − 04 | 7.087D − 06 | 0 |
| r 5: | −4.514D + 00 | 0 | 1.654D − 03 | −3.645D − 05 | 4.06958D − 06 |
| r10: | 2.763D + 01 | 0 | −9.653D − 05 | −9.117D − 08 | 0 |

Numerical Example 2:

| f = 319.2 | | | |
|---|---|---|---|
| r 1 = 63.56 | d 1 = 1.20 | n 1 = 1.49170 | v 1 = 57.40 |
| r 2 = 4.71 | d 2 = 4.15 | | |
| r 3 = Stop | d 3 = 3.80 | | |
| r 4 = 13.82 | d 4 = 3.60 | n 2 = 1.49171 | v 2 = 57.40 |
| r 5 = −4.53 | d 5 = 1.90 | | |
| r 6 = ∞ | d 6 = 14.00 | n 3 = 1.52470 | v 3 = 56.20 |
| r 7 = −21.00 | d 7 = 2.00 | | |
| r 8 = ∞ | d 8 = 25.00 | n 4 = 1.57090 | v 4 = 33.80 |
| r 9 = ∞ | d 9 = 0.20 | | |
| r10 = 27.63 | d10 = 2.50 | n 5 = 1.49171 | v 5 = 57.40 |
| r11 = −14.37 | | | |

Aspheric Coefficients:

| | R | A | B | C | D |
|---|---|---|---|---|---|
| r 1: | 6.356D + 01 | 0 | 1.710D − 03 | −4.948D − 05 | 0 |
| r 4: | 1.382D + 91 | 0 | −9.373D − 04 | −2.528D − 05 | 0 |
| r 5: | −4.534D + 00 | 0 | 1.728D − 03 | −5.426D − 05 | 4.031D − 06 |
| r10: | 2.763D + 01 | 0 | −9.653D − 05 | −9.117D − 08 | 0 |

Numerical Example 3:

| f = 347.0 | | | |
|---|---|---|---|
| r 1 = 25.36 | d 1 = 1.20 | n 1 = 1.49170 | v 1 = 57.40 |
| r 2 = 4.70 | d 2 = 3.68 | | |

-continued

| | f = 347.0 | | |
|---|---|---|---|
| r 3 = Stop | d 3 = 4.00 | | |
| r 4 = 15.81 | d 4 = 3.40 | n 2 = 1.49171 | ν 2 = 57.40 |
| r 5 = −4.48 | d 5 = 1.90 | | |
| r 6 = ∞ | d 6 = 14.00 | n 3 = 1.52470 | ν 3 = 56.20 |
| r 7 = −18.00 | d 7 = 2.00 | | |
| r 8 = ∞ | d 8 = 25.00 | n 4 = 1.57090 | ν 4 = 33.80 |
| r 9 = ∞ | d 9 = 0.20 | | |
| r10 = 27.63 | d10 = 2.50 | n 5 = 1.49171 | ν 5 = 57.40 |
| r11 = −14.37 | | | |

Aspheric Coefficients:

| | R | A | B | C | D |
|---|---|---|---|---|---|
| r 1: | 2.536D + 01 | 0 | 1.009D − 03 | −1.697D − 05 | 0 |
| r 4: | 1.581D + 01 | 0 | −1.047D − 03 | −4.622D − 05 | 0 |
| r 5: | −4.486D + 00 | 0 | 1.453D − 03 | −3.807D − 05 | 2.356D − 06 |
| r10: | 2.763D + 01 | 0 | −9.653D − 05 | −9.117D − 08 | 0 |

Numerical Example 4:

| | f = 257.3 | | |
|---|---|---|---|
| r 1 = −7.18 | d 1 = 1.50 | n 1 = 1.49170 | ν 1 = 57.40 |
| r 2 = 7.63 | d 2 = 4.80 | | |
| r 3 = Stop | d 3 = 4.00 | | |
| r 4 = 17.43 | d 4 = 3.40 | n 2 = 1.49171 | ν 2 = 57.40 |
| r 5 = −4.33 | d 5 = 2.80 | | |
| r 6 = ∞ | d 6 = 14.00 | n 3 = 1.52470 | ν 3 = 56.20 |
| r 7 = −25.00 | d 7 = 2.00 | | |
| r 8 = ∞ | d 8 = 25.00 | n 4 = 1.57090 | ν 4 = 33.80 |
| r 9 = ∞ | d 9 = 0.20 | | |
| r10 = 27.63 | d10 = 2.50 | n 5 = 1.49171 | ν 5 = 57.40 |
| r11 = −14.37 | | | |

Aspheric Coefficients:

| | R | A | B | C | D |
|---|---|---|---|---|---|
| r 1: | −7.189D + 00 | 0 | 6.179D − 03 | −1.096D − 04 | 0 |
| r 2: | 7.630D + 00 | 0 | 2.186D − 03 | 9.391D − 04 | 0 |
| r 4: | 1.743D + 01 | 0 | −2.007D − 03 | 2.694D − 05 | 0 |
| r 5: | −4.338D + 00 | 0 | 1.288D − 03 | −6.073D − 05 | 6.481D − 06 |
| r10: | 2.763D + 01 | 0 | −9.653D − 05 | −9.117D − 08 | 0 |

Numerical Example 5:

| | f = 278.8 | | |
|---|---|---|---|
| r 1 = −14.74 | d 1 = 1.50 | n 1 = 1.49170 | ν 1 = 57.40 |
| r 2 = 7.03 | d 2 = 4.02 | | |
| r 3 = Stop | d 3 = 4.00 | | |
| r 4 = 13.19 | d 4 = 3.50 | n 2 = 1.49171 | ν 2 = 57.40 |
| r 5 = −4.30 | d 5 = 1.50 | | |
| r 6 = ∞ | d 6 = 14.00 | n 3 = 1.57090 | ν 3 = 33.80 |
| r 7 = −18.00 | d 7 = 2.00 | | |
| r 8 = ∞ | d 8 = 25.00 | n 4 = 1.57090 | ν 4 = 33.80 |
| r 9 = ∞ | d 9 = 0.20 | | |
| r10 = 27.63 | d10 = 2.50 | n 5 = 1.49171 | ν 5 = 57.40 |
| r11 = −14.37 | | | |

Aspheric Coefficients:

| | R | A | B | C | D |
|---|---|---|---|---|---|
| r 1: | −1.474D + 01 | 0 | 4.777D − 03 | −2.266D − 04 | 0 |
| r 2: | 7.037D + 00 | 0 | 5.356D − 03 | −4.178D − 04 | 0 |
| r 4: | 1.319D + 01 | 0 | −9.205D − 04 | 2.315D − 05 | 0 |
| r 5: | −4.309D + 00 | 0 | 2.030D − 03 | −4.067D − 05 | 7.186D − 06 |
| r10: | 2.763D + 01 | 0 | −9.653D − 05 | −9.117D − 08 | 0 |

TABLE 1

| Condition | Numerical Example | | | | |
| --- | --- | --- | --- | --- | --- |
| | 1 | 2 | 3 | 4 | 5 |
| (1) (R1 + R2)/(R2 − R1) | −1.31 | −1.16 | −1.46 | 0.03 | −0.35 |
| (2) (R3 + R4)/(R4 − R3) | −0.56 | −0.51 | −0.56 | −0.60 | −0.51 |
| (3) D2/f1 | −0.73 | −0.76 | −0.64 | −1.21 | −0.85 |
| (4) f2/f1 | −0.69 | −0.71 | −0.63 | −1.02 | −0.75 |
| (5) DI/Fe | 0 | 0 | 0 | 0 | 0 |
| (6) fe/R7 | −1.23 | −0.93 | −1.09 | −0.78 | −1.09 |
| (7) N3 | 1.57 | 1.57 | 1.57 | 1.57 | 1.57 |

An example of application of the viewfinder optical system of the invention to a photographing apparatus is described below.

Figure 12A:
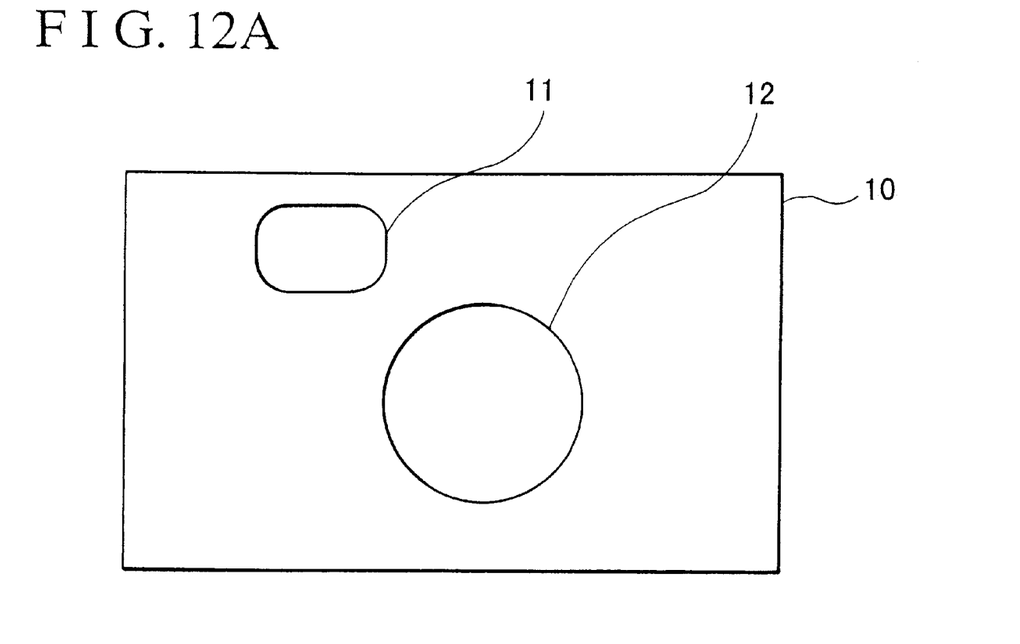
FIGS. 12A and 12B are plan views of the main parts of a photographing apparatus.
Figure 12B:
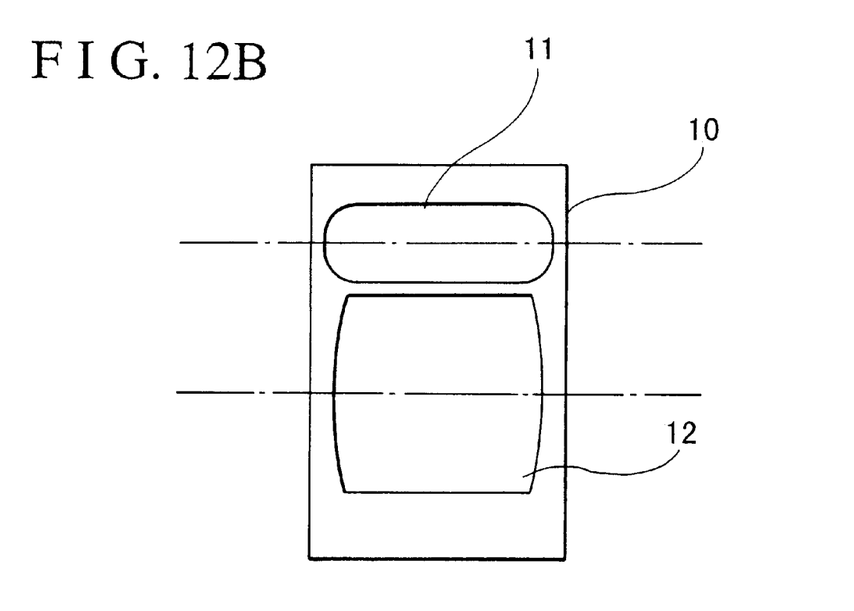

FIGS. 12A and 12B schematically show the main parts of the photographing apparatus (camera), with FIG. 12A in front elevation view and FIG. 12B in longitudinal section view. In FIGS. 12A and 12B, the viewfinder optical system 11 of the invention and a photographic optical system 12 are housed within an apparatus 10. The viewfinder optical system 11 has an optical axis independent of that of the photographic optical system 12.

The use of such an arrangement of the viewfinder optical system of the invention in the photographing apparatus not only assures improvement of the compact form of the apparatus, but also makes it possible to observe a better viewfinder image.

I claim:

1. A viewfinder optical system comprising, in order from an object side to an observation side:

an objective optical system for forming a real image;

a first optical member, said first optical member having a reflective surface by which to change a direction in which a light beam from said objective optical system advances;

a second optical member, the real image being converted into an erecting image through said first optical member and said second optical member; and an eyepiece optical system for observing the erecting image, wherein the real image is formed on or near an exit surface of said first optical member, and the exit surface of said first optical member is a curved surface convex toward the observation side, and wherein said viewfinder optical system satisfies the following conditions:

$$-0.04 < DI/fe < 0.04$$
$$-2 < fe/R7 < -0.3$$

where DI is a distance from the exit surface of said first optical member to the real image, R7 is a radius of curvature of the exit surface of said first optical member, and fe is a focal length of said eyepiece optical system.

2. A viewfinder optical system according to claim 1, wherein said objective optical system comprises, in order from the object side to the observation side, a negative lens and a positive lens.

3. A viewfinder optical system according to claim 2, satisfying the following condition:

$$-5 < \frac{R1 + R2}{R2 - R1} < 5$$

where R1 and R2 are radii of curvature of surfaces on the object side and the observation side of said negative lens, respectively.

4. A viewfinder optical system according to claim 2, satisfying the following condition:

$$-0.9 < \frac{R3 + R4}{R4 - R3} < 0.2$$

where R3 and R4 are radii of curvature of surfaces on the object side and the observation side of said positive lens, respectively.

5. A viewfinder optical system according to claim 2, satisfying the following condition:

$$-2 < D2/f1 < -0.3$$

where D2 is an axial air separation between said negative lens and said positive lens, and f1 is a focal length of said negative lens.

6. A viewfinder optical system according to claim 2, satisfying the following condition:

$$-2 < f2/f1 < -0.3$$

where f1 and f2 are focal lengths of said negative lens and said positive lens, respectively.

7. A viewfinder optical system according to claim 2, wherein said objective optical system is provided with an aperture stop in between said negative lens and said positive lens.

8. A viewfinder optical system according to claim 2, wherein said objective optical system has at least three aspheric surfaces.

9. A viewfinder optical system according to claim 1, satisfying the following condition:

$$1.5 < N3$$

where N3 is a refractive index of a material of said first optical member.

10. A viewfinder optical system according to claim 1, wherein said first optical member is a triangle optical member having two reflective surfaces.

11. A viewfinder optical system according to claim 1, wherein said first optical member has viewfinder information on the exit surface thereof.

12. A viewfinder optical system according to claim 1, wherein said second optical member has a roof surface.

13. A photographing apparatus comprising:

a photographic optical system; and a viewfinder optical system according to one of claims 1 through 12, said viewfinder optical system having an optical axis independent of that of said photographic optical system.

* * * * *

UNITED STATES PATENT AND TRADEMARK OFFICE
CERTIFICATE OF CORRECTION

PATENT NO.    : 6,052,541
DATED         : April 18, 2000
INVENTOR(S)   : Takeshi NISHIMURA It is certified that error appears in the above-identified patent and that said Letters Patent is hereby corrected as shown below:

COLUMN 2:

Line 60, "shown" should read --shown in--.
Line 63, "viewfinder" should read -the viewfinder--.

COLUMN 3:

Line 17, "A" should be deleted.

COLUMN 5:

Line 22, "furthermore" should read --further--.

COLUMN 6:

Line 15, "coincident" should read --coincidence--.

COLUMN 7:

Line 10, "simply" should read --simplify--.

COLUMN 8:

Line 14, "v3 = 33.50" should read --v3 = 33.80--.

UNITED STATES PATENT AND TRADEMARK OFFICE
CERTIFICATE OF CORRECTION

PATENT NO.   :  6,052,541
DATED        :  April 18, 2000
INVENTOR(S)  :  Takeshi NISHIMURA Page 2 of 2

It is certified that error appears in the above-identified patent and that said Letters Patent is hereby corrected as shown below:

COLUMN 9:

Line 47, "6.179D-03" should read --6.178D-03--.
Line 48, "9.391D-04" should read --9.891D-04--.

COLUMN 10:

Line 64, "2.315D-05" should read --2.815D-05--.

Signed and Sealed this

Eighth Day of May, 2001

NICHOLAS P. GODICI

*Attest:*

*Attesting Officer*   Acting Director of the United States Patent and Trademark Office